United States Patent
Matthijsse et al.

(10) Patent No.: US 7,826,691 B2
(45) Date of Patent: Nov. 2, 2010

(54) OPTICAL COMMUNICATION SYSTEM AS WELL AS A ACCESS NETWORK PROVIDED THEREWITH

(75) Inventors: Pieter Matthijsse, Hapert (NL); Marinus Jacob De Fouw, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 738 days.

(21) Appl. No.: 11/381,440

(22) Filed: May 3, 2006

(65) Prior Publication Data
US 2009/0010596 A1      Jan. 8, 2009

(30) Foreign Application Priority Data
May 4, 2005    (NL)   .................................... 1028978

(51) Int. Cl.
*G02B 6/02* (2006.01)
*H04B 10/13* (2006.01)
(52) U.S. Cl. .................. 385/14; 385/123; 398/139; 398/144
(58) Field of Classification Search ............ 398/144
See application file for complete search history.

(56) References Cited

U.S. PATENT DOCUMENTS

| | | | |
|---|---|---|---|
| 4,799,754 A * | 1/1989 | Goldenberg | 385/33 |
| 4,802,724 A * | 2/1989 | Fraize et al. | 385/135 |
| 5,712,937 A | 1/1998 | Asawa et al. | |
| 6,055,262 A * | 4/2000 | Cox et al. | 372/96 |
| 6,185,346 B1 | 2/2001 | Asawa et al. | |
| 6,496,301 B1 * | 12/2002 | Koplow et al. | 359/337 |
| 6,711,330 B1 * | 3/2004 | Donlagic | 385/123 |
| 2004/0247320 A1 * | 12/2004 | Bickham et al. | 398/71 |

FOREIGN PATENT DOCUMENTS

| | | |
|---|---|---|
| EP | 0 286 350 | 10/1988 |
| JP | 55-3456 | 3/1980 |
| JP | 63-81407 | 4/1988 |

OTHER PUBLICATIONS

Broadband Access and In-House Networks—Extending the Capabilities of Multimode Fibre Networks, Koonen, et al., Symposium M03.1; EcOC-100G 2003 Proceedings—vol. 5.

* cited by examiner

*Primary Examiner*—Jerry T Rahll
(74) *Attorney, Agent, or Firm*—Sughrue Mion, PLLC

(57) ABSTRACT

The invention relates to an access network for exchanging communication signals between a transit network and at least one communication medium of a user. The communication medium is operatively connected to an exchange by means of an optical fiber connection for exchanging the communication signals, and the exchange is connected to the transit network. The fiber connection comprises at least one multimode fiber, which is bent over at least one first part of its length, in such a manner that the fiber comprises at least one complete winding in the first part thereof mainly for maintaining one or more modes of the communication signals into the fiber. Said modes have been selected from a group comprising the ground mode and one or more lower modes near the ground mode.

25 Claims, 4 Drawing Sheets

OPTICAL COMMUNICATION SYSTEM AS WELL AS A ACCESS NETWORK PROVIDED THEREWITH

The invention relates to a access network for exchanging communication signals between a transit network and at least one communication medium of a user via an exchange, comprising an optical fibre connection or fibre link for exchanging the communication signals between said exchange and said at least one communication medium.

Such access networks, also referred to as "local loops", are known, they are used for connecting a group of users to a telecommunication network. In such a network, users are connected to exchanges of the telecommunication network by means of a "local tail". The exchanges handle the incoming traffic either by forwarding traffic from the access network to a transit network or "backbone", or by transferring the traffic from the backbone to the correct "local tail" in the access network. Local traffic, for example local telephone calls, are handled by the exchange by transferring said traffic directly from one "local tail" to the other "local tail" in the access network.

The "local tails" in such access networks were traditionally made of copper wire, but for some time now these copper conductors have been replaced by glass fibre conductors. Think in this connection of connecting entire streets, districts and towns by means of glass fibre, in which the existing copper "local tail" is replaced by glass fibre.

The fibre used in access networks is usually a single-mode optical fibre. One reason for this is the effective modal bandwidth to be achieved in single-mode fibre; in the case of single-mode fibre said effective modal bandwidth is sufficiently high, so that the signal broadening caused by modal dispersion remains within bounds over distances of up to about 5 km, which occur frequently in access networks. Thus, speeds of up to 100 Mbit/sec are possible when using single-mode fibre.

A drawback of the use of single-mode fibre is the relatively small core diameter of the fibre. The core diameter of a single-mode fibre is typically in the order of <10 µm. For that reason, the welding of two single-mode fibre is a painstaking task, as the cores of the two single-mode fibres must preferably be aligned as precisely as possible upon being connected. Poor alignment will lead to larger optical losses across the weld. As generally a large number of welds are to be made in an access network, the implementation of an access network based on single-mode fibre is an enormously, time-consuming and costly project.

As it is furthermore not possible to achieve a uniform quality for all the welds in the access network, and the performance across such welds strongly depends on how well or how poorly the cores of the two welded-together fibres connect to each other, the optical loss across every weld is relatively large and moreover varies from weld to weld. In addition to that, the overall optical loss caused by the presence of welds strongly depends on the number of welds in a connection or link.

An additional drawback is the relatively large bending loss in a single-mode fibre when said fibre is bent over (part of) its length. Bends frequently occur in fibres in an access network, but the bending loss problem occurs in particular near welds where the excess fibre length used for welding is stored in a storage cassette. The bending loss can be kept within bounds by storing the excess fibre length that is usually present at welds in a storage cassette having a radius of 3.5-4 cm (and consequently a diameter of up to about 8 cm). In an access network this in turn leads to other problems, however, as will be explained hereinafter.

An access network usually comprises a relatively large number of welds. Theoretically it is possible to bundle the excess lengths of a large number of fibres that follow the same path and store them in a single storage cassette. This makes it possible to keep the amount of space required for storing the fibre within bounds. This is however not a usual solution, as changes are frequently made in the access network. Such a storage cassette containing a number of fibres would thus have to be opened and handled frequently. Moving the storage cassette for the purpose of making a change in one of the fibres may lead to a disturbance in the transmission in one of the other fibres stored in the same storage cassette.

It is therefore common practice to store every fibre connection separately in a storage cassette in the access network. In view of the large number of fibres and the large number of welds, a substantial number of storage cassettes are used, so that also a large amount of space is required for storage. However, as the density of buildings continues to increase, especially in town centres, and also the number of other networks to which every household/building needs to be connected (cable TV, gas, water, electricity, sewerage, etc) is increasing, the available space is likewise limited. It should in this connection be taken into account that the roadway must be left undisturbed as much as possible when digging an access network, in view of the inconvenience caused to the traffic when the roadway is broken up. Thus, the only space that remains is below the pavement, in which connection it should furthermore be considered that also the depth to be dug constitutes a restricting factor. Digging deeper takes more time and requires a better preparation in view of the presence of other networks at other depths.

Consequently it is an object of the present invention to provide an access network in which optical losses across the connection or link are minimized and in which the available space underground is utilized as economically as possible.

The above and further objects are achieved by the present invention in that it provides an access network for exchanging communication signals between a transit network and at least one communication medium of a user via an exchange, comprising an optical fibre connection for exchanging the communication signals between said exchange and said at least one communication medium, characterized in that said fibre connection comprises at least one multimode fibre with a core and a cladding surrounding said core, which fibre is bent over at least one part of its length for substantially attenuating one or more modes of the communication signals in the fibre that propagate in a ring-shaped area around the centre of the core adjacent to the cladding.

The invention is based on the insight that bending losses mainly occur in higher modes of the optical signal. In a wound-up part of a multimode fibre having a given radius of curvature, the bending loss will decrease strongly over the length of the wound-up part when the higher modes that are prone to extinction or darkening have disappeared from the optical signal. Extinction of said higher order modes takes place at the beginning (seen in a given direction of propagation of the optical signal) of the bent part of the fibre. The length over which extinction of the higher modes in particular takes place amounts to the length of about one winding of a wound-up fibre. Hardly any bending loss will occur any more in further windings and in any further bent parts further down the fibre, since the higher modes have already extinguished across the first winding (seen in the direction of propagation of the signal), and the optical signal only comprises lower modes which are not sensitive, or hardly so, to bending losses in a multimode fibre.

Since said bending does not, or does hardly, affect the lower modes of the signal, the fibre can be wound up with a much smaller radius of curvature than, for example, a single-mode fibre in which the signal is in its entirety much more sensitive to bending of the fibre. This makes it possible to use storage cassettes having radii of curvature of as little as 10 mm, which is a significant improvement as regards making an economical use of the available space underground.

An access network comprising a multimode fibre used in this manner meets the requirements of maximum bending loss in such a network. Moreover, the intensity gain (due to improved attenuation characteristics) achieved across the fibre storage can be used for compensating for effective modal bandwidth of the multimode fibre.

In addition to that, the advantage of using multimode fibre is that the core diameter of the fibre is much greater than that of single-mode fibre, for example, and that therefore welds are easier to make. As a result, the implementation of an entire access network comprising a large number of fibres and an even larger number of welds becomes less complicated and thus less expensive.

Since the diameter of the core is much larger, aligning the cores of two fibres to be welded together will be easier. As a result, the welding losses will be smaller because a higher quality weld can be realized. A further improvement as regards the optical losses across the weld occurs because it is mainly the lower modes of the optical signal that are transferred in an access network according to the invention. Said lower modes concentrate near the ground mode at the central axis through the core. Hardly any optical signal transfer takes place at the outer edge of the core. In the case of a low-quality weld, when the two fibres are poorly aligned, signal loss will occur at the point where the section of the core of one fibre does not connect to (or overlap) the section of the core of the other fibre. This is in particular the case at the outer edges of the fibres. The optical signal consisting mainly of low modes will therefore be less sensitive to poorly made welds.

According to one embodiment, the ring-shaped area extends over part of the section of the core in dependence on the radius of curvature of said at least one bent part. Adaptation of the radius of curvature makes it possible to influence the attenuating effect of the bent fibre, in particular which higher-order signals are attenuated and to what extent.

According to one embodiment, the bent first part of the fibre is located near a first end thereof. Since a certain excess fibre length is usually required at the end of an optical fibre near a weld, the bent part can coincide with the excess fibre length, so that a wound-up part of the fibre forms the bent part thereof. The fibre may furthermore be bent over at least a second part thereof, which is located near a second end of the fibre. The advantage of this is that in the case of a duplex signal the higher modes of the optical signal will already attenuate upon being launched into the fibre.

According to a preferred embodiment, the invention provides an access network wherein the fibre is connected to a light source with the first end thereof for launching an optical signal into the fibre, wherein the fibre has a first numeric aperture and the light source has a second numeric aperture, and wherein the second numeric aperture is sufficiently small in comparison with the first numeric aperture for launching the optical signal into the fibre in restricted mode so as to concentrate the optical signal in the ground mode of the fibre as much as possible.

By launching light into the multimode fibre directly by means of a light source having a numeric aperture that is much smaller than the numeric aperture of the fibre, light will be launched into the multimode fibre in restricted mode ("restricted mode launch"). This makes it possible to concentrate the optical signal that is launched into the multimode fibre by the transmitter unit in the ground mode of the fibre as much as possible, so that the propagation of the optical signal in the fibre will take place along the central axis of the fibre as much as possible. As bending losses in the fibre occur in particular in the higher order modes within the multimode fibre, which higher order modes predominate in the outer part of the core (seen from the central axis), near the cladding of the optical fibre, the bending loss in the bent part of the multimode fibre will only be small. Moreover, since the fibre is directly connected to the transmitter unit, the optical connection itself does not comprise any additional welds across which losses may occur.

According to a preferred embodiment of the invention, the second numeric aperture is configured in such a manner that the optical signal mainly concentrates in the ground mode or in one or more lower modes of the fibre near the ground mode.

As already described above, it is preferable to avoid the use of higher modes as much as possible. The use of other, lower modes near the ground mode in addition to the ground mode leads to an effective use of the optical fibre with a view to obtaining the highest possible light output at the output thereof.

According to another embodiment of the invention, the light source comprises a semiconductor laser. A VCSEL-type laser may be used for this purpose, for example. VCSEL lasers have a relatively small numeric aperture in comparison with the numeric aperture of an average multimode fibre, and consequently they are very suitable for use with the present invention.

Another embodiment of the invention further comprises a receiver that is optically connected to the fibre connection or link for receiving the optical signal.

In another preferred embodiment, the invention further provides an optical communications system as described above, wherein the light source is incorporated in a first transceiver for launching a first optical signal into the fibre and receiving a second optical signal from the fibre, further comprising a second transceiver that is optically connected to the fibre connection for receiving said first optical signal from the fibre, wherein said second transceiver comprises a light source having a third numeric aperture for launching said second optical signal into the fibre, said third numeric aperture being sufficiently small in relation to the first numeric aperture for launching light into the fibre in restricted mode so as to concentrate the second optical signal in the ground mode of the fibre as much as possible.

It should be understood that it is readily possible in this manner to provide a duplex system which is not much affected by bending and/or welding losses and in which, in addition, only multimode fibres are used. It is noted in this connection that such a system does not comprise any unnecessary welds.

According to another preferred embodiment, said third numeric aperture is chosen such that the optical signal mainly concentrates in the ground mode or in one or more lower modes of the fibre near the ground mode. As already described above for the aforesaid simplex solution, an effective use is made of the fibre in this manner with a view to obtaining the highest possible light output on the side where the second optical signal is received.

According to one embodiment, in order to maximize the field of application of the optical communications system according to the invention, the multimode fibre that is used preferably has an effective modal bandwidth (EMB) of at least 1000 MHz·km at a wavelength that is frequently used for optical communication, for example a wavelength of the optical signal in excess of 800 nm. The multimode fibre in particular provides such an effective modal bandwidth at wavelengths of about 850 nm, about 1300 nm or about 1500 nm. Preferably, the multimode fibre has an effective modal bandwidth (EMB) of at least 1000 MHz·km at a wavelength ranging between 1250 nm and 1700 nm.

According to another embodiment thereof, a fibre having an effective modal bandwidth (EMB) of at least 1000 MHz·km at minimally two wavelengths differing by at least 75 nm is used as the multimode fibre. The use of such a multimode fibre enables the use of wavelength division multiplexing (WDM) for such an optical communications system.

Preferably, said at least two wavelengths range between 1250 nm and 1700 nm, which wavelengths are frequently used for transferring optical signals over communication networks.

The multimode fibre that is used may have a modal field diameter of at least 50 μm. Fibres having a diameter of 50 μm or 62.5 μm are frequently used multimode fibres which are suitable for use in embodiments of the invention.

The bent part of the fibre can have a very small radius of curvature, with bending losses that remain within bounds, because of the fact that the higher modes in the original signal have substantially extinguished and that the signal mainly comprises lower modes.

Rolling up a part of the multimode fibre with a relatively small radius of curvature, for example, which radius of curvature is smaller than 2 cm or even smaller than 1 cm, for example, makes it possible to store any excess length of a multimode fibre in a very compact manner. Radii of curvature of 15 mm are possible. Usually the available space for storing excess length in fibres is limited. An example of this is, for example, the amount of available space underground upon installation of an access network. The density of buildings is very great in some places, in particular in the centres of large cities, for example, whilst in addition the number of infrastructure networks (sewerage, energy, water, . . . ) to which a building or a house is to be connected is considerable. Although it would be possible to store several fibres in a single storage cassette, this is not preferable in most cases, since alterations need to be made in the access network relatively frequently. When an alteration is made in one connection, movement of the storage cassette may cause damage to another connection stored in the same storage cassette. For that reason separate storage cassettes are generally used for each connection.

From the above example it is apparent that major advantages are achieved by making the storage cassette as compact as possible and, in addition, restricting the number of welds as much as possible. It is noted in this connection that usually an excess length of fibre must be available for every weld in order to be able to make the weld in the fibre. Consequently, at least one storage cassette will have to be installed for every weld. According to another embodiment, the multimode fibre is therefore wound around a cylindrical body, for example a storage cassette.

The invention will now be discussed in more detail in the description below of non-limitative embodiments thereof, in which reference is made to the appended drawings, in which:

FIG. 1 schematically shows an optical signal in a multimode fibre;

Figure 1:
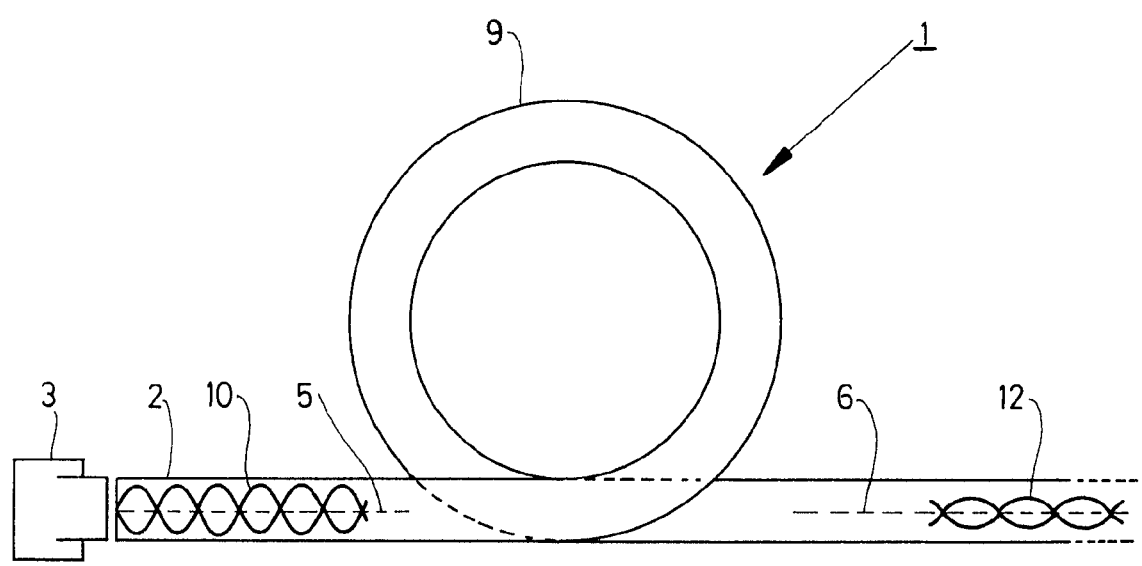

FIG. 1 shows a core of multimode fibre 1, which is wound up over part 9 of its length (in one winding). At the end 2, light is launched into the fibre 1 by means of an optical element 3 in so-called "overfilled launch" (OFL), with light being launched into all or nearly all of the modes of the multimode fibre 1. The core of the fibre has a central axis indicated by the dotted line 5 near the end 2 and by the dotted line 6 further down the fibre, after the bent part 9.

The signal launched into the fibre in overfilled launch is schematically indicated by the envelope 10 of the optical signal in FIG. 1. Since the higher modes of the optical signal are effectively attenuated in the bent part 9, after the bent part 9 the signal will be concentrated in the lower order and ground mode. In FIG. 1 this is indicated by the envelope 12 of the optical signal, after the end part.

Figure 2:
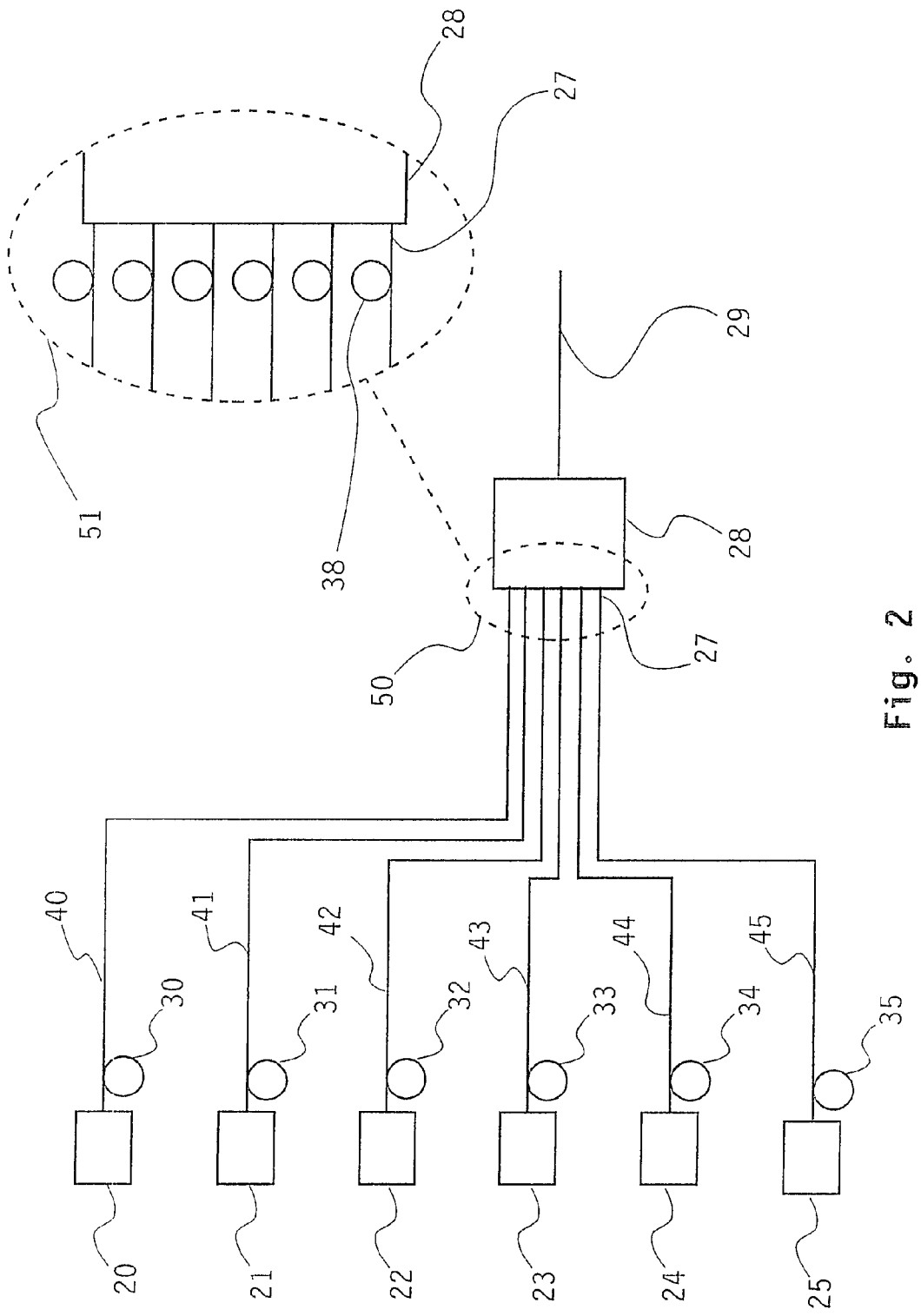
FIG. 2 shows an access network in which an optical communications system according to the invention is used.

FIG. 2 shows an implementation of the optical communication system according to the invention in an access network (schematically indicated) of a telecommunication network. In this schematically indicated access network, a multitude of users 20, 21, 22, 23, 24 and 25 are connected to a backbone (not shown) of a telecommunication network. This takes place by connecting each of the users (20, 21, 22, 23, 24 and 25) by means of a local tail consisting of a glass fibre connection to a distribution frame ("main distribution frame"—MDF) 28. The user 20 is connected to the MDF 28 by means of the multimode fibre 40. In a similar manner, the users 21, 22, 23, 24 and 25 are connected to the MDF 28 by means of the multimode fibres 41, 42, 43, 44 and 45, respectively. An optical coupling 27 of the fibre 45 provides the optical contact between the distribution frame 28 and the fibres 40, 41, 42, 43, 44 and 45.

Since an excess length will generally be used near the connections of the multimode fibres, a storage cassette 30, 31, 32, 33, 34 and 35 is present near each connecting point of the users 20, 21, 22, 23, 24 and 25, respectively, in which cassette the excess multimode fibre length is wound up. Due to the use of the optical communication system according to the invention, the radius of curvature of the roll-up fibres 40, 41, 42, 43, 44 and 45 in the storage cassettes 30, 31, 32, 33, 34 and 35, respectively, amounts to 0.5 cm, for example, so that the diameter of each storage cassette is not larger than (something over) 1 cm (including the wound-up fibre). The use of the optical communication system according to the invention, in particular the multimode fibre having a relatively large numeric aperture and the light source having a relatively small aperture, makes it possible to roll up the fibres with a small radius of curvature in the storage cassettes. As the higher order modes of the multimode fibres are not used, or hardly so, as a result of optical signals being launched into the multimode fibres in this manner, hardly any bending loss will occur in the storage cassettes 30, 31, 32, 33, 34 and 35.

The connections of the fibres 40, 41, 42, 43, 44 and 45 to the distribution frame 28, for example by means of the optical coupling 27, is shown in enlarged view in FIG. 2 by means of dotted ovals 50 (which indicates the enlarged area) and 51 (which shows the enlargement). In the oval 51, which shows the enlargement of the connection to the distribution frame (28), it can be distinguished that each of the connected fibres is provided with a storage cassette, such as the storage cassette 38, near the distribution frame. Also in this case it obtains that the bending losses in such a storage cassette are only small, because of the manner in which optical signals are launched into the multimode fibre. The distribution frame 28 is furthermore connected to the backbone of a telecommunication network by means of the fibre connection 29 (the backbone is not shown).

Figure 3:
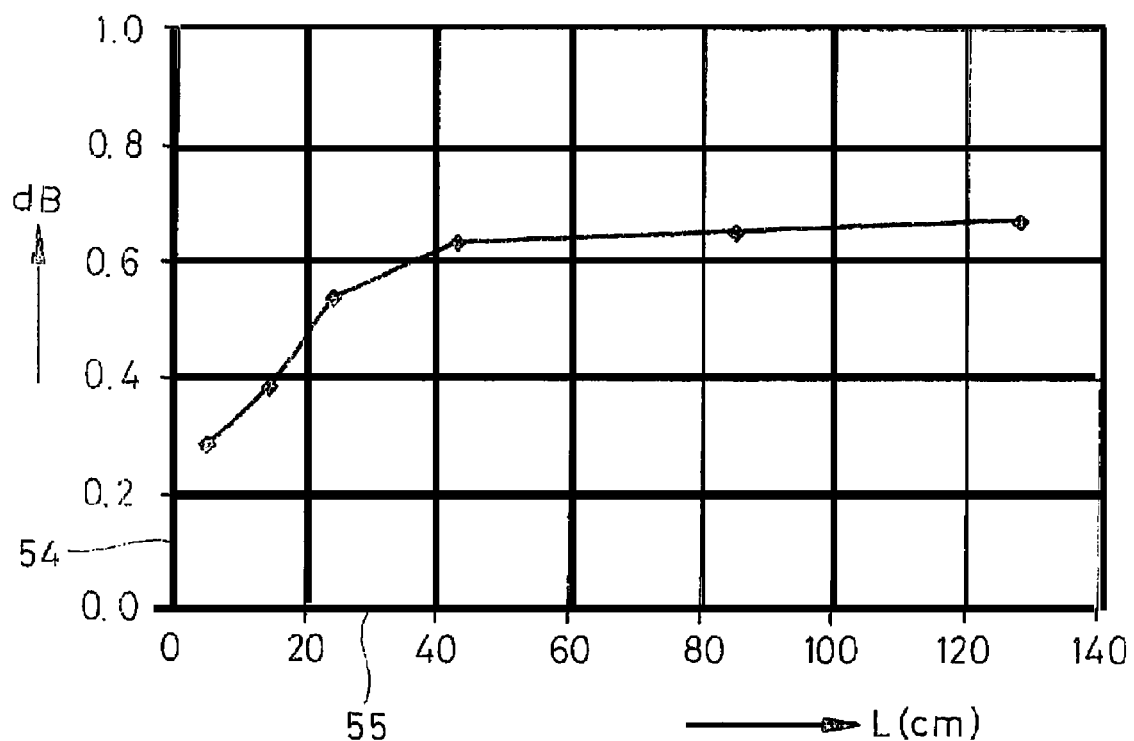
FIG. 3 shows the measured bending loss in an optical signal that has been launched into the fibre in "overfilled launch"

FIG. 3 shows the results of an experiment carried out with a test arrangement, in which light is launched into a multimode fibre in all the available modes ("overfilled launch"— OFL). Figure three shows the bending losses in the optical signal in dependence on the length over which the multimode fibre is wound up. The experiment was carried out with a 1300 nm optical signal in a graded index multimode fibre. The radius of curvature of the wound-up fibre is 15 mm. The vertical axis 54 of the graph represents the bending loss in decibels, the horizontal axis 55 indicates the path of the optical signal through the bent part of the fibre.

The experiment shows that the greatest bending loss occurs in the first 40 cm of the one-up multimode fibre. Hardly any bending losses occur thereafter. The explanation for this is that bending losses occur in particular around the higher modes of the signal in the multimode fibres. The optical signal in the higher modes of the fibre will be lost in the cladding, therefore, which process continues until finally only lower modes of the optical signal remain in the core of the multimode fibre. Since the lower modes of the optical signal in the fibre are hardly troubled by bending loss, the optical signal is substantially insensitive to further bending of the fire after 40 cm of wound-up fibre, when the higher modes in the optical signal have substantially disappeared.

Figure 4:
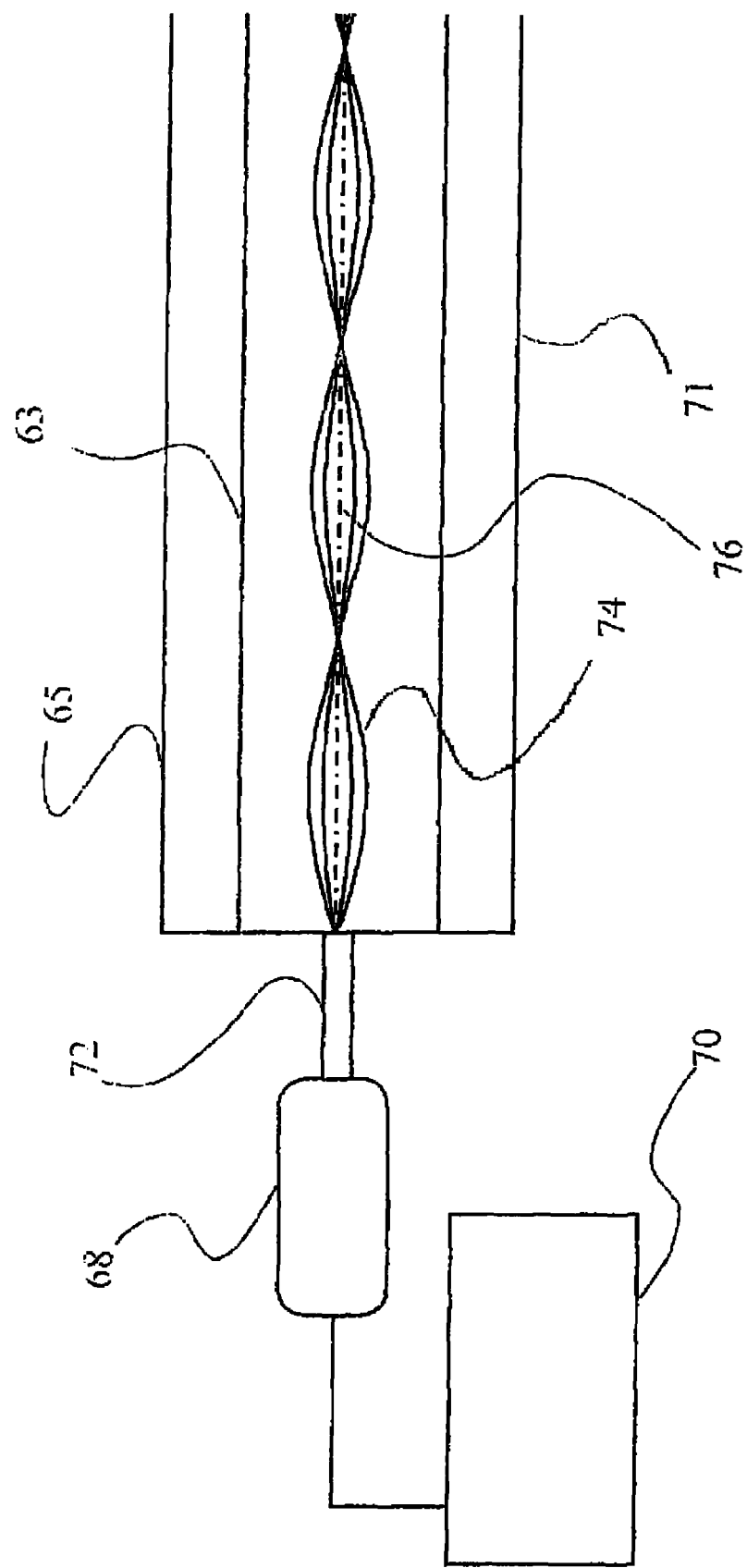
FIG. 4 shows an embodiment of the invention in which light is launched into a multimode fibre by a light source.

The embodiment of the invention that is shown in FIG. 4, which will now be discussed, makes use of this principle by launching light into the multimode fibre with a relatively small numeric aperture (in comparison with the numeric aperture of the fibre itself), so that the optical signal mainly concentrates in the lower modes. As substantially no higher modes are present in the signal in that case, the optical signal will not be sensitive to the presence of bends and wound-up parts in the fibre. Bending losses will be relatively small, therefore. In addition, the number of welds in the fibre connection can be minimized by making use of such a light source having a small numeric aperture. This offers major advantages, for example in an access network comprising relatively many welds.

FIG. 4 shows an embodiment of the invention comprising a multimode fibre schematically indicated (in sectional view) at 71, which consists of a core 63 and a cladding 65. The central axis through the centre of the multimode fibre is indicated by means of the chain-dotted line 66. The multimode fibre is optically connected to a light source 68, which comprises a VCSEL-type laser, for example, and which provides a light beam 72 to be launched into the multimode fibre. The light source 68 is connected to or forms part of a transmission system 70, in which a binary electrical signal, for example, is converted for driving the light source 68 to provide the optical signal.

The light source 68 that provides the light beam 72 launches light into the multimode fibre in such a manner that the optical signal concentrates around the ground mode and the lower modes of the multimode fibre near said ground mode as much as possible. To that end, the light source 68 has been selected so that the numeric aperture thereof is relatively small in comparison with the numeric aperture of the fibre.

Because the signal concentrates in the ground mode and the lower modes 74 of the multimode fibre, and because the higher modes of the multimode fibre and 71 are not used, or hardly so, as a consequence thereof, only minor bending losses will occur in the multimode fibre 71 if the multimode fibre 71 is for example bent over part of its length (this is not shown in FIG. 4).

Although an air gap appears to be present between the light source and the end of the multimode fibre 71 in FIG. 4, this is not necessarily the case in practice. As a rule, the optical coupling between the light source 68 and the multimode fibre 71 will be such that the optical loss that occurs at this transition will be minimal. As a rule, the air gap that is suggested in FIG. 4 will not be present, therefore, but it is only included in FIG. 4 for the purpose of schematically indicating the beam 72. Consequently, the light source 68 and the end of the fibre 71 will normally be in intimate contact with each other.

The embodiments are shown in the figures for the sole purpose of illustrating the principle of the invention. The scope of the invention described herein is only limited by the claims. It will be understood that the embodiments as shown in an illustrated herein must not be construed as being limitative, therefore.

The invention claimed is:

1. An access network for exchanging communication signals between a transit network and at least one communication medium of a user via an exchange, comprising:
   said exchange,
   said at least one communication medium, and
   an optical fibre connection connecting said exchange and said at least one communication medium so that communication signals can be exchanged between said exchange and said at least one communication medium,
   wherein said fibre connection comprises at least one multimode communication fibre with a core and a cladding surrounding said core,
   wherein said fibre is bent over at least one part of its length so that said fibre substantially attenuates one or more modes of the communication signals in the fibre that propagate in a ring-shaped area around the centre of the core adjacent to the cladding, and
   wherein the fibre is connected to a light source by means of a direct connection for launching optical communication signals into said fibre.

2. An access network according to claim 1, wherein the ring-shaped area extends over part of the section of the core in dependence on the radius of curvature of said at least one bent part.

3. An access network according to claim 1, wherein at least the bent first part of the fibre is located at a first end thereof.

4. An access network according to claim 1, wherein said at least one bent part comprises a second bent part, which is located at a second end of the fibre.

5. An access network according to claim 1, wherein the fibre is connected to the light source with a first end thereof for launching an optical signal into the fibre, wherein the fibre has a first numeric aperture and the light source has a second numeric aperture, and wherein the second numeric aperture is sufficiently small in comparison with the first numeric aperture for launching the optical signal into the fibre in restricted mode, for concentrating the optical signal in the ground mode of the fibre.

6. An access network according to claim 5, wherein the second numeric aperture is configured in such a manner that the optical signal is mainly concentrated in the ground mode or in one or more lower modes of the fibre near the ground mode.

7. An access network according to claim 5, wherein said light source comprises a semiconductor laser.

8. An access network according to claim 7, wherein said semiconductor laser is a VCSEL-type laser.

9. An access network according to claim 5, wherein the light source is incorporated in a first transceiver for launching a first optical signal into the fibre and receiving a second optical signal from the fibre, further comprising a second transceiver that is optically connected to the fibre connection for receiving said first optical signal from the fibre, wherein said second transceiver comprises a light source having a third numeric aperture for launching said second optical signal into the fibre, said third numeric aperture being sufficiently small in relation to the first numeric aperture for launching light into the fibre in restricted mode so as to concentrate the second optical signal in the ground mode of the fibre.

10. An access network according to claim 9, wherein said third numeric aperture is configured in such a manner that the optical signal mainly concentrates in the ground mode or in one or more lower modes of the fibre near the ground mode.

11. An access network according to claim 1, further comprising a receiver that is optically connected to the fibre connection for receiving the optical signal.

12. An access network according to claim 11, wherein the receiver is connected to a second end of the fibre.

13. An access network according to claim 1, wherein the multimode fibre is made of a material containing quartz.

14. An access network according to claim 1, wherein the multimode fibre has an effective modal bandwidth (EMB) of at least 1000 MHz.km at a wavelength of the optical signal in excess of 800 nm.

15. An access network according to claim 14, wherein the multimode fibre has an effective modal bandwidth (EMB) of at least 1000 MHz.km at a wavelength ranging between 1250 nm and 1700 nm.

16. An access network according to claim 14, wherein the effective modal bandwidth (EMB) of the fibre is at least 1000 MHz.km at minimally two wavelengths differing by at least 75 nm.

17. An access network according to claim 16, wherein said at least two wavelengths range between 1250 nm and 1700 nm.

18. An access network according to claim 1, wherein the multimode fibre comprises a core having a diameter of at least 50 μm.

19. An access network according to claim 1, wherein the bent first part has a radius of curvature of less than 2 cm.

20. An access network according to claim 1, wherein the bent first part is stored in a storage cassette.

21. The access network according to claim 1, wherein the bent part of said fibre is adjacent to either the exchange or the at least one communication medium.

22. The access network according to claim 1, wherein substantially the entire length of the optical fibre connection is made up of said at least one multimode fibre.

23. An access network for exchanging communication signals between a transit network and at least one communication medium of a user via an exchange, comprising:
  said exchange,
  said at least one communication medium, and
  an optical fibre connection connecting said exchange and said at least one communication medium so that communication signals can be exchanged between said exchange and said at least one communication medium,
  wherein said fibre connection comprises at least one multimode communication fibre,
  wherein an excess length of said fibre is stored in a storage cassette,
  wherein said fibre has a bent part that is stored in the storage cassette,
  wherein the bent part has a radius of curvature which is less than 2 cm, and
  wherein the fibre is connected to a light source by means of a direct connection for launching said communication signals into said fibre.

24. The access network according to claim 23, wherein substantially the entire length of the optical fibre connection is made up of said at least one multimode fibre.

25. The access network according to claim 23, wherein the bent part of said fibre is adjacent to either the exchange or the at least one communication medium.

* * * * *